UNITED STATES PATENT OFFICE.

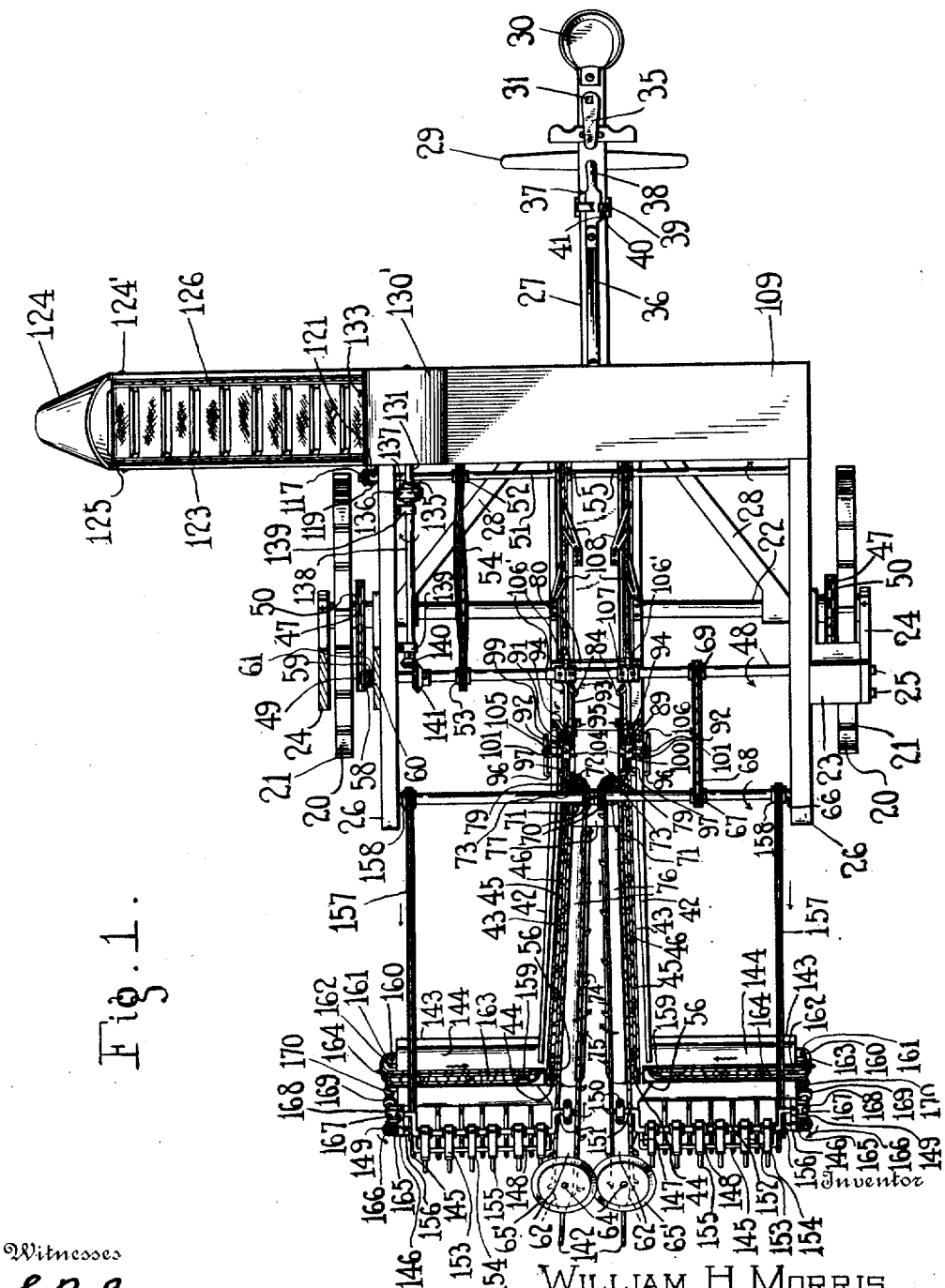

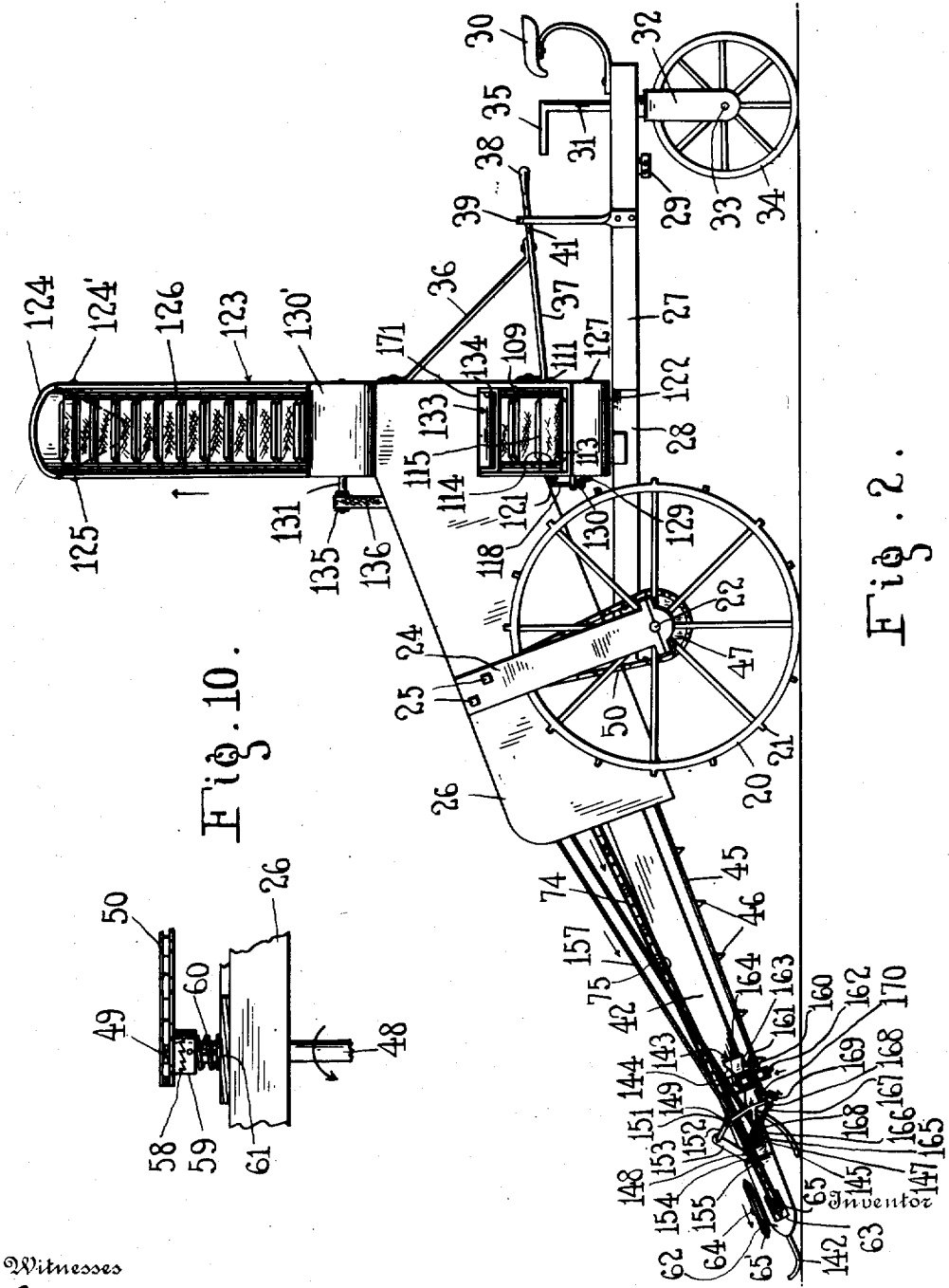

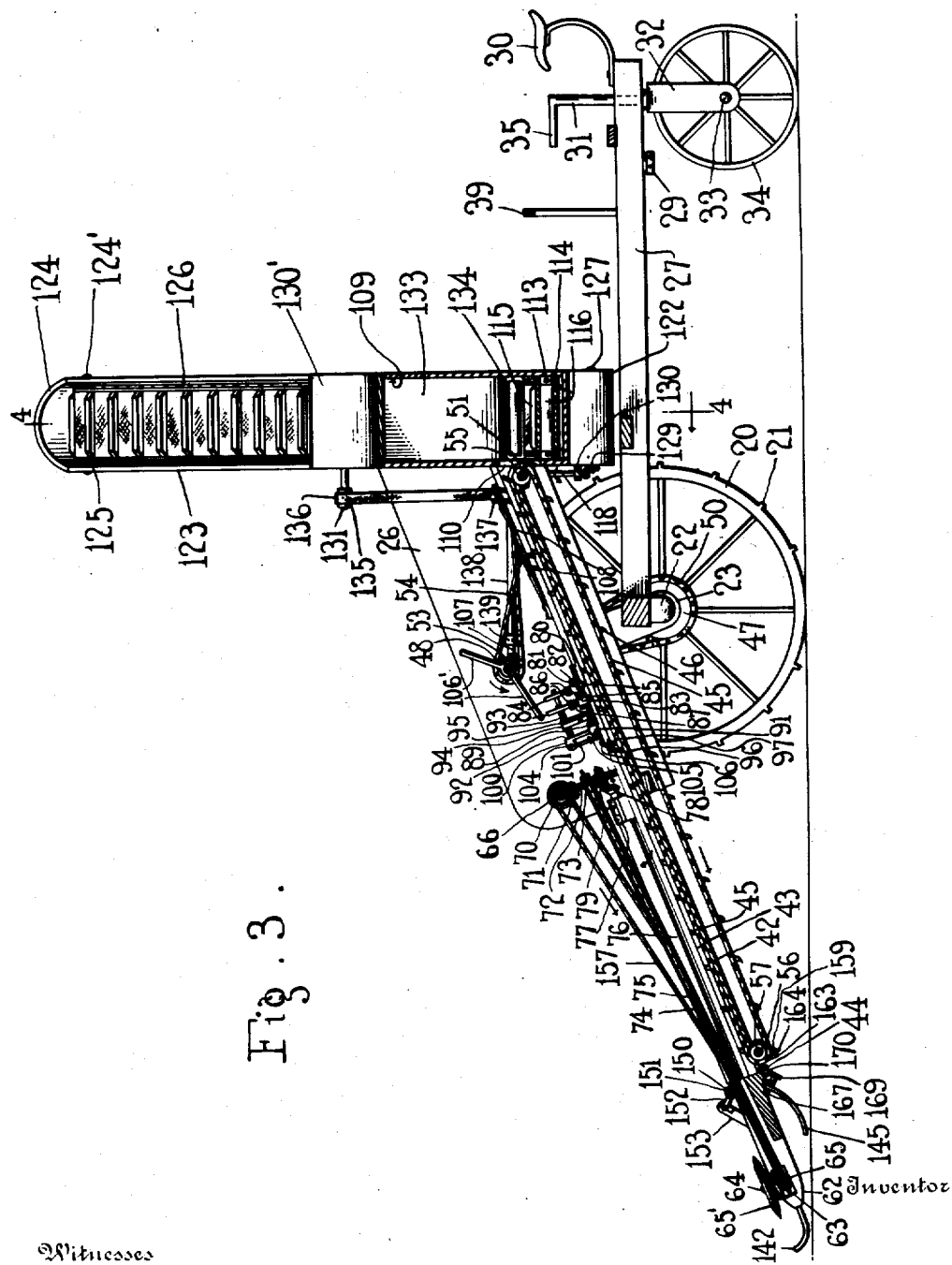

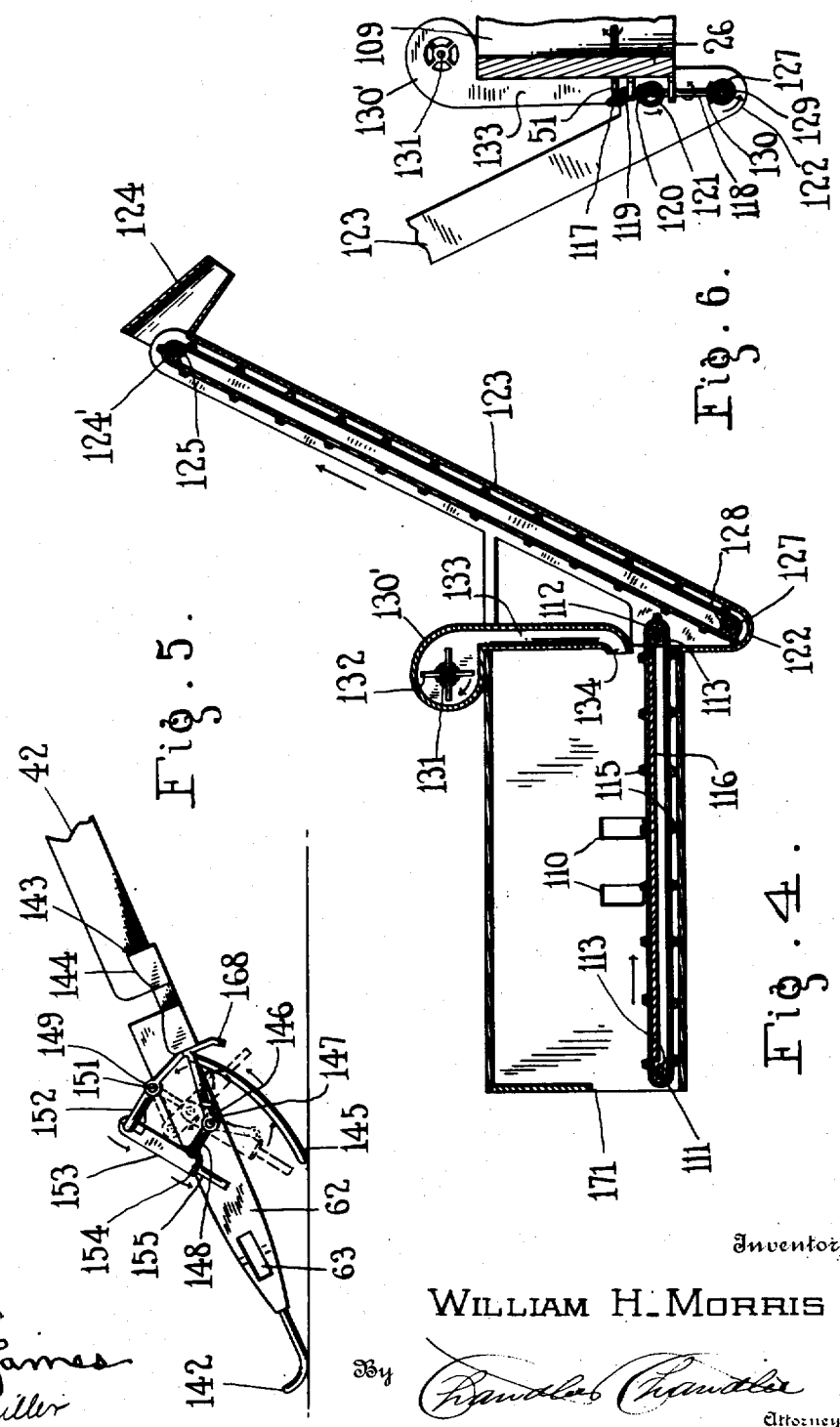

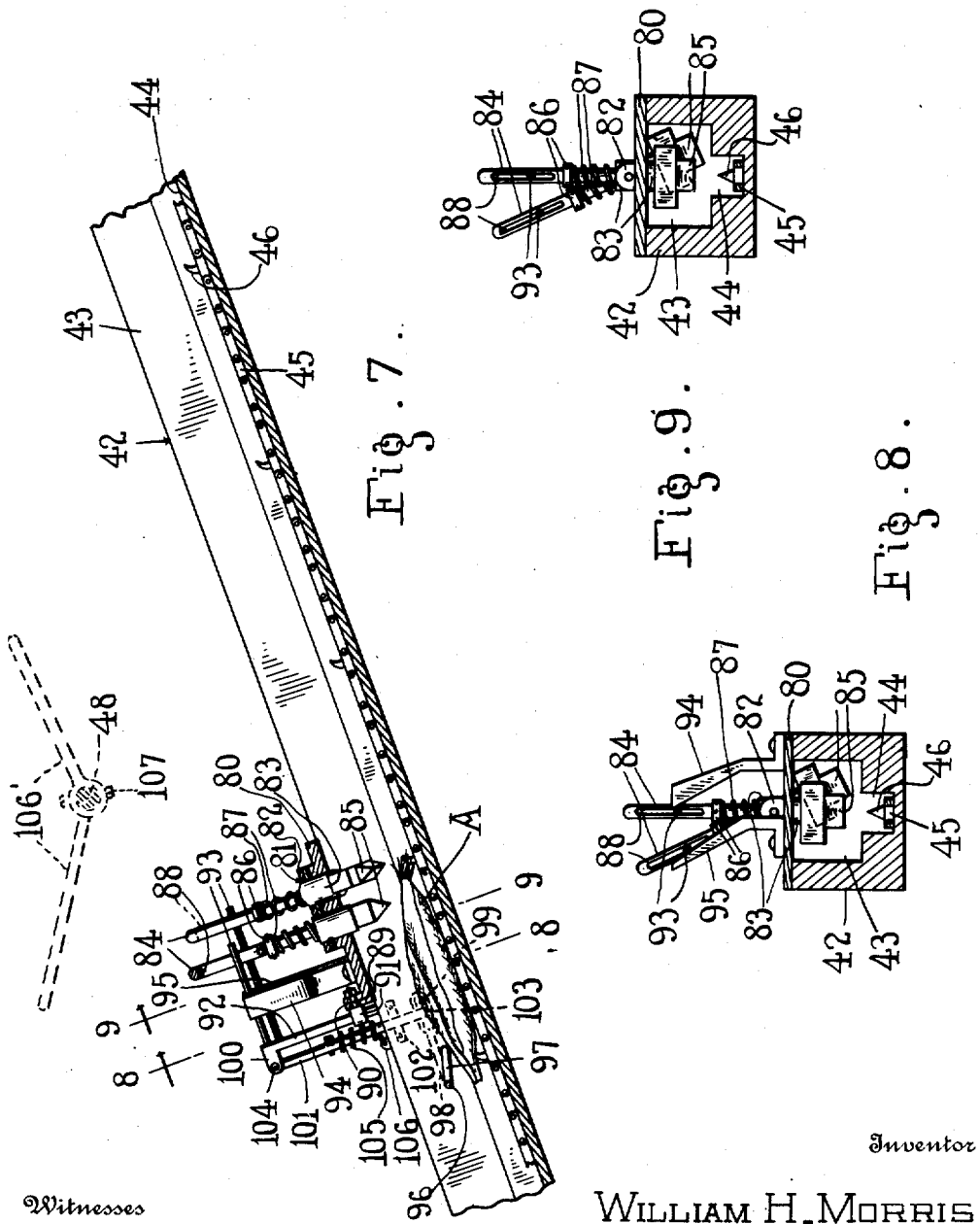

WILLIAM H. MORRIS, OF CARROLL, NEBRASKA, ASSIGNOR OF ONE-HALF TO ANDREW TEXLEY, OF CARROLL, NEBRASKA.

CORN-HARVESTER.

986,198.   Specification of Letters Patent.   Patented Mar. 7, 1911.

Application filed September 27, 1909. Serial No. 519,725.

*To all whom it may concern:*

Be it known that I, WILLIAM H. MORRIS, a citizen of the United States, residing at Carroll, in the county of Wayne, State of Nebraska, have invented certain new and useful Improvements in Corn-Harvesters; and I do hereby declare the following to be a full, clear, and exact description of the invention, such as will enable others skilled in the art to which it appertains to make and use the same.

This invention relates to agricultural implements and more especially to a corn harvester of the type wherein the corn is removed from the stalk, the removal being effected by snapping rolls, and then shucked, the shucks being separated from the cobs of corn.

One object of the invention is to improve the general construction of harvesters of this character.

Another object of the invention is to provide a novel means whereby corn ears which may have dropped upon the ground during the process of harvesting or prior to that process may be picked up, deposited in the harvester machinery and shucked with the other corn which is snapped off the stalks.

With the above and other objects in view as will be hereinafter apparent, the invention consists in general of a corn harvester provided with devices for carrying the stalks to the rear of the harvester and there snapping the ears off, together with novel means for picking up and harvesting the dropped ears in combination with novel cutting arrangement for removing the ends of the shucks from the ears.

The invention further consists in certain novel arrangement of details and combinations of parts hereinafter fully described, illustrated in the accompanying drawings, and specifically set forth in the claims.

In the accompanying drawings, like characters of reference indicate like parts in the several views, and:—Figure 1 is a top plan view of a corn harvester constructed in accordance with this invention. Fig. 2 is a side elevation thereof. Fig. 3 is a longitudinal median section thereof. Fig. 4 is a sectional view on the line 4—4 of Fig. 3. Fig. 5 is a detail view showing the gathering mechanism for the dropped ears. Fig. 6 is a detail view showing the driving mechanism for the fan and elevator and its conveyer. Fig. 7 is a detail view showing the ear cutting mechanism. Fig. 8 is a sectional view on the line 8—8 of Fig. 7. Fig. 9 is a similar view on the line 9—9 of Fig. 7. Fig. 10 is a detail view of the traction wheel clutch mechanism.

In order to make clear the complete application of this harvester certain cutting mechanism for the ends of the ears as well as certain husking mechanism has been described but it is to be understood that this cutting and husking mechanism is merely typical of any preferred form.

Supported upon suitable tractor wheels 20 provided with tractor blades 21 is a shaft 22. Mounted on the ends of the shaft 22 are U-shaped supports comprising an inner member 23 provided with a cover plate 24 which is secured to the inner member by means of suitable bolts 25. The wheels 20 are held upon the shaft between the inner member 23 and the cover plate 24 and attached to the inner member 23 are the side members 26 of the frame which support the mechanism of the device.

Secured to the shaft 22 and extending rearwardly therefrom is a tongue 27, which is braced to the shaft by means of diagonal braces 28. This tongue is provided with a suitable double-tree 29 for the purpose of attaching draft animals and has upon its rear end an operator's or driver's seat 30. Adjacent the driver's seat and preferably immediately in front thereof is a standard 31 having a forked lower end as indicated at 32 and within this forked lower end is supported an axle 33 whereon is mounted a steering wheel 34. The upper end of the standard 31 is provided with a steering arm 35 which is so arranged as to lie convenient to the driver's hand when he is operating the machine. In order that the angle between the tongue 27 and the side members 26 may be varied at the operator's will there is provided upon the rear of the machinery frame a suitable brace 36 to which is connected a rack engaging lever 37 provided with a handle 38 adjacent the operator's seat and this rack engaging lever is arranged to have the rear end thereof move up and down in a U-shaped guide 39 provided on its inside with suitable teeth 40 to engage a lip 41 formed on the rack engaging lever 37. The members 37 and 36 are of sufficient resiliency to permit the lip 41 to be disengaged from the teeth 40 by pulling the handle to one side and by depressing the handle the front of the machine is raised and the angle between the members 26 and 27 is lessened and by allowing the handle to rise the angle is increased. In this manner the angle may be adjusted at the will of the driver.

For the purpose of distinguishing between the frame comprising the members 27 and 28 and the frame having the side members 26 the former will be called throughout the specification the main frame while the latter will be described as the tilting frame.

Mounted upon the tilting frame is a pair of members 42 which are parallel at their upper ends and have at their lower ends a slight divergence as clearly indicated in Fig. 1. These members 42 are provided throughout their length with valleys 43 for the purpose of receiving the ears of corn. These valleys are further provided with longitudinal slots extending throughout the bottom as indicated at 44 and in these slots moves the upper side of a conveyer belt 45 provided with conveyer fingers 46 projecting therefrom. The under side of the belt 45 passes below the members 42 as can be clearly seen from reference to Fig. 3.

To the shaft 22 adjacent each of the wheels 20 are attached sprocket wheels 47. In the frame members 26 is mounted a shaft 48 and upon the ends of this shaft, which project through the frame members 26, are carried sprocket wheels 49 and chains 50 connect each of the sprocket wheels 47 with its respective sprocket 49. A shaft 51 is also supported in the frame members 26 and upon this shaft is carried a sprocket wheel 52 which is connected to a sprocket wheel 53 carried on the shaft 48 by means of a crossed sprocket chain 54. The shaft 51 further supports sprockets 55 which carry the upper end of the conveyer belt 45, the lower end being carried by means of sprockets 56 supported on a shaft 57.

In order to provide for the variation of the revolution of the wheels 20 in turning a corner the sprockets 49 are loose upon the shaft 48 and have each connected thereto a ratchet clutch member 58 while there is secured to the shaft 48 to rotate therewith an engaging ratchet clutch member 59 which is normally held in engagement with its respective member 58 by means of a suitable coil spring 60 held between the member 58 and a bearing plate 61 mounted on the respective member 26.

Securely fixed to the lower ends of the members 42 are extensions 62 provided with slots 63 at the lower end wherein are mounted shafts 64 which carry sprockets 65. These shafts 64 are extended through the members 62 and upon their upper ends are carried circular cutting knives 65' of any preferred form and which are here shown as having their edges overlapping so as to make a species of cutting shear. Mounted in the members 26 is a shaft 66 provided with a sprocket wheel 67 which is connected by means of a chain 68 with a sprocket wheel 69 mounted on the shaft 48. By means of this arrangement when the shaft 48 rotates the shaft 66 will also rotate. Upon the shaft 66 are mounted bevel gears 70 which are arranged to mesh with other bevel gears 71 carried on shafts 72 whereon are supported sprockets 73. Carried by the sprockets 73 and 65 are stalk gathering conveyers comprising sprocket chains 74 provided with fingers 75 which extend inwardly in opposition to each other. As will be observed from an inspection of Fig. 1 these stalk gathering conveyers are wider apart at the forward end than at the rear end where they are adjacent the driving sprocket 73.

It will be observed from this construction that when the shaft 66 is rotated by the movement of the wheels 20 the stalk conveyer chains 74 will be caused to move upward on their adjacent sides while at the same time the knives 65' are rotated in the same direction so that the corn is cut off near the bottom and is then moved upward by the stalk conveyers, passing at the same time to the rear of the machine.

In order to remove the ears of corn from the stalks which are being carried up by the conveyer there is provided a pair of snapping rolls 76 having their lower ends supported in the members 62 while their upper ends are carried in suitable bearings 77 mounted on the members 42. The upper ends of these snapping rolls are reduced and are each provided with a bevel gear 78 which meshes with a bevel gear 79 carried on the shaft 72 and rotating therewith. These bevel gears 78 and 79 are so arranged that the snapping rolls 76 grasp the stalk of corn and move the same downward through the snapping rolls. The rolls are furthermore spread apart at their lower ends to permit the easy introduction of the stalk while at their upper ends they are brought closely together so as to grasp the stalk as it is carried backward and insure its passing downward therethrough and the removal of the ears of corn. In order to prevent the ears from falling through the snapping rolls the rolls are positioned closely enough together at the upper end that no ears may pass therethrough. Furthermore, in order that the ears which have been snapped off may be properly carried to the upper end of the rolls the conveyer chains 74 are positioned also close together at the upper end so that no ears can slip backward down the snapping rolls 76.

It will be understood that the construction is such that the snapping rolls extend along the members 42 so that but few of the ears will be conveyed upward by the stalk conveyers 74, the majority of the ears falling over the conveyers 74 and dropping into the valleys 43 where they are carried up by means of the ear conveyer belt 45.

There will now be described the mechanism by means of which the tip and butt of each ear is cut off so as to leave the shucks free for removal from the ears. Across each of the members 42 is mounted a cover plate 80 provided with openings 81 therethrough and these openings have adjacent each side thereof a bearing 82 wherein is mounted a rocking guide 83 through which pass the stems 84 of knife or cutter members 85. These cutter members are distinguished respectively by the terms front and rear cutter members, the front cutter member lying toward the snapping rolls while the rear cutter member lies toward the operator's seat. Each of the stems 84 is provided with a suitable collar 86 and between the collars 86 and the guide sleeves 83 are held compression springs 87 which normally serve to hold the knives raised as indicated in Fig. 7. The stems 84 are further provided with longitudinal slots extending along their upper ends as clearly indicated in Figs. 8 and 9 at
88. The plate 80 is further provided at its forward end with a bearing 89 wherein is mounted a swivel pin 90 which supports a swiveling sleeve 91. Held in said swiveling sleeve 91 to move therethrough is a plunger 92 which carries at its upper end a pair of rearwardly extending arms 93 one of which engages in one of the slots 88 while the other engages the other slot. Mounted upon the plate 80 are guide members in the form of cam plates and comprising an inwardly inclined cam plate 94 and an outwardly inclined cam plate 95 the opposed surfaces of said cam plates being substantially parallel throughout. By means of this construction as the plunger 92 is raised or depressed the stems 84 are swung so that one or the other is positioned vertically while the remaining stem is inclined to one side. In Figs. 7, 8 and 9 the front knife member 85 is shown as arranged vertically while the rear knife member is swung to one side. It will be plain from an inspection of these figures that if the pin 90 be moved downward by the plunger the guide 95 will force both the stems 84 to the right and will consequently bring the stem of the rear knife member to the position now occupied by the front knife member.

In order to actuate the plunger 92 upon the passage of an ear of corn there is provided a rod 96 which extends through the walls of the members 42 wherein it is positioned and each of these rods 96 has a rearwardly and downwardly projecting central portion 97 which lies within the valleys 43 while the outer end of each rod is provided with an arm 98 having a slotted eye 99 in its rear end. The plunger 92 is provided with a forwardly extending ear 100 and a rod 101 is held in a suitable bearing 102 and is provided with a lower angle portion 103 which engages in the slot 99 and an upper angle portion 104 which is pivotally engaged in the ear 100. The rod 101 is further surrounded by a tension spring 105 which has one end attached to the rod and the other end to a lug 106 on the members 42. By means of this construction the rod 101 is normally depressed and carries with it the plunger 92 and pin 90. In order to actuate the knife members 85 the shaft 48 has mounted thereon a pair of striking arms 106' which may be adjusted to vary their angular relations by means of suitable nut screws 107.

In order to understand the operation of this device there has been indicated in Fig. 7 an ear of corn as at A in the act of passing beneath the cutting knives. As the ear strikes the trip 97 the rod 101 is raised and carries therewith the plunger 92. This causes the arms 93 to move up and the guides 94 and 95 act to bring the forward cutter member 85 in a vertical position. Meanwhile the shaft 48 is rotating and as this cutter member comes into the vertical position one of the arms 106' contacts with the upper ends thereof and forces the cutter member down thus severing the tip from the ear, the parts being so arranged with reference to speed and proportions that this tip comes just under the knife when the arm 106' strikes the stem 84 of the forward cutting member. This is permitted by means of the adjustability of the arm 106' on the shaft 48. Now as the ear A is carried farther up the butt of the ear passes from beneath the trip 97 and the rod 101 is brought down by the spring 105 carrying therewith the plunger 92 and fingers 93. This causes the rear cutter member 85 to be positioned vertically while the forward cutter member 85 is swung to the right of Figs. 8 and 9. The second arm 106' has been positioned previously on the shaft 48 so that the angular distance between the two arms 106' will be such as to permit the ear A to pass rearward so that only its butt remains underneath the rear knife 85 when the arm 106' which actuates that member comes into operation. As this arm comes around it strikes the rear stem 84 and depresses the knife and cuts off the butt.

Mounted on each side of each of the members 42 and to the rear of the cutter knives just described there are provided diagonally arranged shucking hooks 108 which are so positioned as to remove the shucks from the ears of corn after they have been cut and permit them to be pushed over the sides of the members 42 as fast as the ears pass underneath these shucking hooks. The diagonal arrangement furthermore has another function which consists in rotating the ear so that the hooks to the rear of the first hooks are enabled to remove the shucks from the other side of the ear.

Mounted upon the rear of the tilting frame is a conveyer casing 109 provided on its forward side with openings 110 which are held in alinement with the valleys 43 so that ears led up through these valleys pass through the openings 110. Supported on shafts 111 and 112 are sprockets 113 over which pass chains 114 provided with conveyer flights 115 and these conveyer flights are arranged to move transversely of the harvester over a conveyer table 116.

In order to actuate the conveyer just described the shaft 51 is projected through one of the members 26 and carries upon its outer end a bevel gear 117. Supported on the members 26 is a countershaft 118 provided with a bevel gear 119 which meshes with the gear 117. The countershaft 118 is further provided with a bevel gear 120 which meshes with a bevel gear 121 fixed upon the shaft 112. By means of this construction the conveyer which extends transversely of the implement is actuated as the wheels are rotated by the machine being drawn forward. Adjacent the delivery end of the conveyer is a boot 122 to which is attached a conveyer chute 123 terminating in the delivery spout 124 at its upper end, which spout is so arranged that it is sufficiently high that a wagon may be drawn along beneath the spout in order that the material delivered therefrom may fall into the wagon. At the upper end of the conveyer chute 123 is a shaft 124' whereon are mounted sprockets 125 which support the chains 126 of a conveyer moving within the chute 123. Within the boot 122 is a shaft 127 which is provided with sprockets 128 similar to the sprockets 125 and these latter sprockets support the lower ends of the conveyer chains 126. In order to drive this elevator conveyer the shaft 127 is prolonged to extend outside of the boot and upon this prolonged end is supported a bevel gear 129 which meshes with a bevel gear 130 attached to the shaft 118 previously described. By this construction the two conveyers are so arranged that they are simultaneously operated as the machine is drawn forward. When the ears pass through the openings 110 there may remain upon these ears a portion of the husk and in order to detach this remaining portion and prevent its being delivered with the ears through the spout 124 there is mounted on top of the casing 109 a fan casing 130' wherein is mounted on a shaft 131 a blower 132. Communicating with the fan casing is a downwardly extending blast pipe 133 which terminates at its lower end in a curved nozzle 134 which is directed in opposition to the movement of the conveyer chains 114 over the conveyer plate 116. In order to actuate this blower 132 the shaft 131 is continued forwardly through the casing 130' and upon this continued portion is mounted a belt pulley 135 which is connected by a belt 136 to a belt pulley 137 fixed upon a shaft 138 carried in bearings 139 supported on one of the side members 26. The forward end of the shaft 138 is provided with a bevel gear 140 which meshes with a bevel gear 141 fixed upon the shaft 48.

In order to provide for the stalks of corn being properly guided to the knife blades 65' the forward ends of the members 62 have projecting therefrom guide teeth 142. These guide teeth have their forward ends upwardly inclined as clearly shown in Figs. 2 and 3 so that they do not tend to dig into the ground but ride along thereover and furthermore the guide teeth are preferably made of resilient material so that they will not break or be forced into the ground.

Securely attached to each of the members 42 and projecting laterally therefrom are lateral ear conveyer chutes 143 each of which is provided with a longitudinal valley 144. These conveyer chutes 143 are inclined downward at their forward ends and are provided along the forward edges with spaced gathering fingers 145. These gathering fingers are so arranged that their lower ends pass close to but do not dig into the ground. Supported in the forward ends of the members 42 and in bearings 146 formed on the members 143 are shafts 147 provided with cranks 148. Similarly supported in bearings 149 on the members 143 and bearings 150 on the members 62 are shafts 151 provided with cranks 152. The arms of the cranks 152 are longer than the arms of the cranks 148 so that the pitmen 153 which connect these cranks have a rotary movement at one end while the other end oscillates through the arc of a circle. These pitmen 153 are provided on their lower or forward ends with rake heads 154 having a plurality of spaced teeth 155 extending therefrom, these teeth 155 being so arranged as to lie and move in vertical planes intermediate of the teeth 145. In order to actuate this portion of the mechanism there is provided on the shaft 147 certain sprockets 156 which are connected by means of chains 157 with sprockets 158 mounted on the shaft 66. By means of this construction the various pitmen 153 will have a motion somewhat similar to that of a tedder. Owing to this mechanism in front of the machine any ears of corn which may have dropped upon the ground will be picked up upon the fingers 145 and carried up thereon by means of the fingers 155 and deposited in the valley 144 of the respective members 143. These valleys 144 communicate through suitable openings or depressions at the inner ends thereof with the valleys 43.

In order to provide for carrying ears of corn which may be deposited in the valleys 144 to the longitudinal valleys 43 upon each of the members 143 is mounted an inner sprocket 159 and upon the outer ends of the members 143 are formed bearings 160 wherein is held a shaft 161 which supports a sprocket 162. Extending around the respective sprockets 159 and 162 is a conveyer chain 163 which is provided with conveyer teeth 164. This conveyer chain is so arranged that the upper portion thereof moves inward along the valley 144 thus conveying any ears of corn which may be deposited therein to the inner end and forcing them into the valley 43 where they are treated precisely the same as the ears which are normally received from the snapping rolls 76. In order to drive the shaft 161 the shaft 147 is provided on its outer end with a bevel gear 165 which meshes with a gear 166 carried on a shaft 167 supported in suitable bearings 168 mounted on the respective members 143. Each of these shafts 167 has upon its lower end a bevel gear 169 which meshes in turn with a bevel gear 170 fixed upon the respective shafts 161.

In the operation of this device the draft animals are hitched in any suitable manner to the double-tree 29 and the driver takes his seat at 30. The machine is then started forward after the driver has regulated the proper angle for the tilting frame by means of the lever 37 and as the wheels 20 are rotated the sprocket chains 50 will rotate the shaft 48 which in turn actuates the shafts 51 and 66. These shafts in turn, as has been previously described, actuate the various elements of the machine. The harvester is driven along a row of corn and the knife blades 65' come in contact with the stalks and sever them at their lower ends. These stalks then fall between the conveyer members 74 and are carried to the rear of the apparatus where the ears are snapped off and dropped into the traps or valleys 43 at which they are conveyed beneath the knives 85 where their ends are removed and from whence they pass under the fingers 108 where the husks are stripped. From this place they pass through the openings 110 into the conveyer which runs transversely across the rear of the machine and any of the remaining husks are blown backward and out of the casing 109 through an opening 171 to one side thereof while the now entirely husked ears are carried to the elevator 123 up which they pass to fall out of the chute 124 into a cart or other suitable receptacle therebeneath. Meanwhile any ears that have fallen on the ground are gathered by the fingers 145 and the other mechanism described in connection therewith and are deposited in the valleys 144 along which they are carried by the conveyer chains 163 to be deposited in the valleys 43 and cut and stripped precisely as has been previously described. It is thus obvious that by means of this harvester all of the corn is saved and is readily harvested and deposited in a wagon or other suitable receptacle without reference to whether it be on the ground or still on the stalk. There has thus been provided a highly efficient device of the character described and for the purpose specified.

It is obvious that many minor changes may be made in the form and construction of this invention without departing from the material principles thereof. It is not therefore desired to confine the invention to the exact form herein shown and described, but it is wished to include all such as properly come within the scope of the appended claims.

Having thus described the invention, what is claimed as new, is:—

1. In a corn harvester, an ear gathering mechanism comprising stationary ear collecting fingers, a crank arranged to rotate continuously in one direction, a pitman connected thereto and having a feeding finger at one end, and a guide element arranged to move the other end of said pitman in a curved path.

2. In a corn harvester, an ear gathering mechanism comprising stationary ear collecting fingers, a crank arranged to rotate continuously in one direction, a pitman connected thereto and having a feeding finger at one end, and a guide element arranged to move the other end of said pitman in the arc of a circle.

3. In a corn harvester, an ear gathering mechanism comprising stationary ear collecting fingers, a crank arranged to rotate continuously in one direction, a pitman connected thereto and having a feeding finger at one end, and a second crank connected to the upper end of said pitman.

4. In a corn harvester, an ear gathering mechanism comprising stationary ear collecting fingers, a crank arranged to rotate continuously in one direction, a pitman connected thereto and having a feeding finger at one end arranged to pass between the adjacent ear collecting fingers, and a reciprocatory crank being longer than the first mentioned crank.

5. In a corn harvester, an ear gathering mechanism comprising stationary ear collecting fingers, a crank arranged to rotate continuously in one direction, a pitman connected thereto and having a feeding finger at one end, a guide element arranged to move the other end of said pitman in a curved path, a conveyer extending across the rear ends of said ear collecting fingers, tractor wheels and an operative connection between said conveyer and crank and the tractor wheels.

6. In a corn harvester, tractor wheels, a longitudinal conveyer, a lateral conveyer, an ear gathering mechanism comprising stationary ear collecting fingers extending forward and downward from the lateral conveyer, a crank, a pitman connected thereto and having a feeding finger at one end, a guide element arranged to move the other end of said pitman in a curved path, and operative connections between said conveyers, the crank, and the tractor wheels.

In testimony whereof, I affix my signature, in presence of two witnesses.

WILLIAM H. MORRIS.

Witnesses:
A. L. TUCKER,
DANIEL DAVIS.